United States Patent
Durocher et al.

(10) Patent No.: US 12,409,940 B2
(45) Date of Patent: Sep. 9, 2025

(54) ELECTRIC MOTOR PROPULSION SYSTEM FOR AN AIRCRAFT

(71) Applicant: Pratt & Whitney Canada Corp., Longueuil (CA)

(72) Inventors: Eric S. Durocher, Boucherville (CA); Michel Labrecque, Ste-Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 169 days.

(21) Appl. No.: 18/209,892

(22) Filed: Jun. 14, 2023

(65) Prior Publication Data

US 2024/0417083 A1 Dec. 19, 2024

(51) Int. Cl.
| | |
|---|---|
| *B64D 27/24* | (2024.01) |
| *B64D 35/00* | (2006.01) |
| *F16H 1/22* | (2006.01) |
| *F16H 57/038* | (2012.01) |
| *F16H 57/04* | (2010.01) |
| *H02K 7/116* | (2006.01) |
| *F16H 57/02* | (2012.01) |

(52) U.S. Cl.
CPC ............. *B64D 27/24* (2013.01); *B64D 35/00* (2013.01); *F16H 1/22* (2013.01); *F16H 57/038* (2013.01); *F16H 57/0441* (2013.01); *H02K 7/116* (2013.01); *F16H 2057/02026* (2013.01); *F16H 2057/02034* (2013.01); *F16H 2057/02043* (2013.01); *F16H 2057/02082* (2013.01)

(58) Field of Classification Search
CPC ...... B64D 35/021; B64D 35/00; B64D 27/02; B64D 27/24; B64D 27/30; F02C 7/32
See application file for complete search history.

(56) References Cited

U.S. PATENT DOCUMENTS

| | | | | |
|---|---|---|---|---|
| 5,782,433 | A * | 7/1998 | Goi | B64C 27/14 |
| | | | | 475/216 |
| 8,324,746 | B2 * | 12/2012 | Bradbrook | F02C 3/10 |
| | | | | 290/1 A |
| 10,273,883 | B2 | 4/2019 | Roach | |
| 11,415,061 | B2 * | 8/2022 | De Wergifosse | B60K 6/36 |

(Continued)

FOREIGN PATENT DOCUMENTS

FR 3146966 A1 9/2024

OTHER PUBLICATIONS

EP Search Report for EP Patent Application No. 24182372.3 dated Oct. 25, 2024.

*Primary Examiner* — Tye William Abell
(74) *Attorney, Agent, or Firm* — Getz Balich LLC (57) ABSTRACT

An assembly for a propulsion system of an aircraft includes a gearbox module, an electric motor assembly, a first accessory load assembly, and a propulsor. The gearbox module includes a gear assembly and an output shaft. The gear assembly includes a main gear and a plurality of offset gears. The electric motor assembly includes an electric motor. The electric motor includes a rotor. The rotor is mounted to a first offset gear of the plurality of offset gears. The rotor is configured for rotation about a rotational axis to drive rotation of the gear assembly and the output shaft. The first accessory load assembly includes at least one first accessory load. The at least one first accessory load is mounted to a second offset gear of the plurality of offset gears. The propulsor is coupled to the output shaft.

19 Claims, 6 Drawing Sheets

(56) References Cited

U.S. PATENT DOCUMENTS

| | | |
|---|---|---|
| 11,485,503 B2 | 11/2022 | Dubreuil |
| 2020/0307812 A1* | 10/2020 | Dubreuil ................ B64D 35/08 |
| 2021/0179286 A1 | 6/2021 | Harvey |
| 2021/0276706 A1* | 9/2021 | Heironimus ............ B64C 27/68 |
| 2021/0388732 A1* | 12/2021 | Turcotte ................. F01D 15/10 |

* cited by examiner

ELECTRIC MOTOR PROPULSION SYSTEM FOR AN AIRCRAFT

TECHNICAL FIELD

This disclosure relates generally to an aircraft propulsion system and, more particularly, to an electric aircraft propulsion system driven by an electric motor.

BACKGROUND OF THE ART

Electric propulsion systems for aircraft may include an electric motor configured to provide thrust for the aircraft. Various electric aircraft propulsion systems are known in the art. While these known systems have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, an assembly for a propulsion system of an aircraft includes a gearbox module, an electric motor assembly, a first accessory load assembly, and a propulsor. The gearbox module includes a gear assembly and an output shaft. The gear assembly includes a main gear and a plurality of offset gears. The plurality of offset gears are engaged with the main gear. The output shaft and the main gear are configured for rotation about an axial centerline of the gear assembly. The electric motor assembly includes an electric motor. The electric motor includes a rotor. The rotor is mounted to a first offset gear of the plurality of offset gears. The rotor is configured for rotation about a rotational axis to drive rotation of the gear assembly and the output shaft. The first accessory load assembly includes at least one first accessory load. The at least one first accessory load is mounted to a second offset gear of the plurality of offset gears. The propulsor is coupled to the output shaft.

In any of the aspects or embodiments described above and herein, the rotational axis may be radially offset from the axial centerline.

In any of the aspects or embodiments described above and herein, the output shaft may be fixedly mounted to the main gear.

In any of the aspects or embodiments described above and herein, the first accessory load assembly may be axially coincident with the electric motor assembly.

In any of the aspects or embodiments described above and herein, the gearbox module may include a gearbox housing surrounding the gear assembly and the output shaft, the electric motor assembly may include a motor housing, and the motor housing may be mounted to the gearbox housing.

In any of the aspects or embodiments described above and herein, the electric motor assembly may further include a mount assembly mounting the motor housing to the gearbox housing. The mount assembly may include a motor bracket and a plurality of struts. The motor bracket may be mounted to the motor housing at an aft end of the motor housing. Each of the plurality of struts may extend between and connect the motor bracket to the gearbox housing.

In any of the aspects or embodiments described above and herein, the assembly may further include a second accessory load assembly including at least one second accessory load. The at least one second accessory load may be engaged with the output shaft.

In any of the aspects or embodiments described above and herein, the second accessory load assembly may be axially coincident with the electric motor assembly.

In any of the aspects or embodiments described above and herein, the first accessory load assembly may include an oil pump disposed at a vertical bottom of the gearbox module.

In any of the aspects or embodiments described above and herein, the gearbox module may include a gearbox housing surrounding the gear assembly and the output shaft. The oil pump may be disposed within the gearbox housing.

In any of the aspects or embodiments described above and herein, the output shaft may include a bevel gear. The assembly may further include a second accessory load assembly including at least one second accessory load. The at least one second accessory load may be engaged with the bevel gear.

In any of the aspects or embodiments described above and herein, the gear assembly may further include a ring gear engaged with each of the offset gears. The ring gear may be mounted to the output shaft and configured to drive the output shaft for rotation about the axial centerline.

According to another aspect of the present disclosure, an assembly for a propulsion system of an aircraft includes a propulsor, a gearbox module, an electric motor assembly, and a plurality of accessory load assemblies. The gearbox module includes a gear assembly and an output shaft. The gear assembly includes a main gear and a plurality of offset gears. The main gear is configured for rotation about an axial centerline of the gear assembly. The plurality of offset gears are engaged with the main gear. The plurality of offset gears includes a first offset gear and a plurality of second offset gears. The output shaft extends along the axial centerline and interconnects the propulsor and the main gear. The electric motor assembly includes an electric motor. The electric motor includes a rotor. The rotor is mounted to the first offset gear. The rotor is configured for rotation about a rotational axis to drive rotation of the first offset gear. Each accessory load assembly of the plurality of accessory load assemblies includes at least one accessory load coupled to a respective second offset gear of the plurality of second offset gears.

In any of the aspects or embodiments described above and herein, the plurality of accessory load assemblies may be axially coincident with the electric motor assembly.

In any of the aspects or embodiments described above and herein, each offset gear of the plurality of offset gears may be disposed radially adjacent the main gear with respect to the axial centerline.

In any of the aspects or embodiments described above and herein, the rotational axis may be radially offset from the axial centerline.

According to another aspect of the present disclosure, an assembly for a propulsion system of an aircraft includes a propulsor, a gearbox module, an electric motor assembly, and a plurality of accessory load assemblies. The gearbox module includes a gear assembly and an output shaft. The gear assembly includes a main gear and a plurality of offset gears. The plurality of offset gears are engaged with the main gear. The plurality of offset gears includes a first offset gear and a plurality of second offset gears. The output shaft interconnects the propulsor and the main gear. The electric motor assembly includes an electric motor. The electric motor includes a rotor. The rotor is mounted to the first offset gear. The rotor is configured for rotation about a rotational axis to drive rotation of the first offset gear. Each accessory load assembly of the plurality of accessory load assemblies includes at least one accessory load coupled to a respective gear of the main gear or the plurality of offset gears.

In any of the aspects or embodiments described above and herein, the gearbox module may include a gearbox housing surrounding the gear assembly and the output shaft.

In any of the aspects or embodiments described above and herein, the plurality of accessory load assemblies may include a first accessory load assembly including a first accessory load and a second accessory load. The first accessory load may be disposed within the gearbox housing and the second accessory load may be disposed outside the gearbox housing.

In any of the aspects or embodiments described above and herein, the first accessory load may be an oil pump disposed at a vertical bottom of the gearbox housing.

The present disclosure, and all its aspects, embodiments and advantages associated therewith will become more readily apparent in view of the detailed description provided below, including the accompanying drawings.

DETAILED DESCRIPTION

Figure 1:
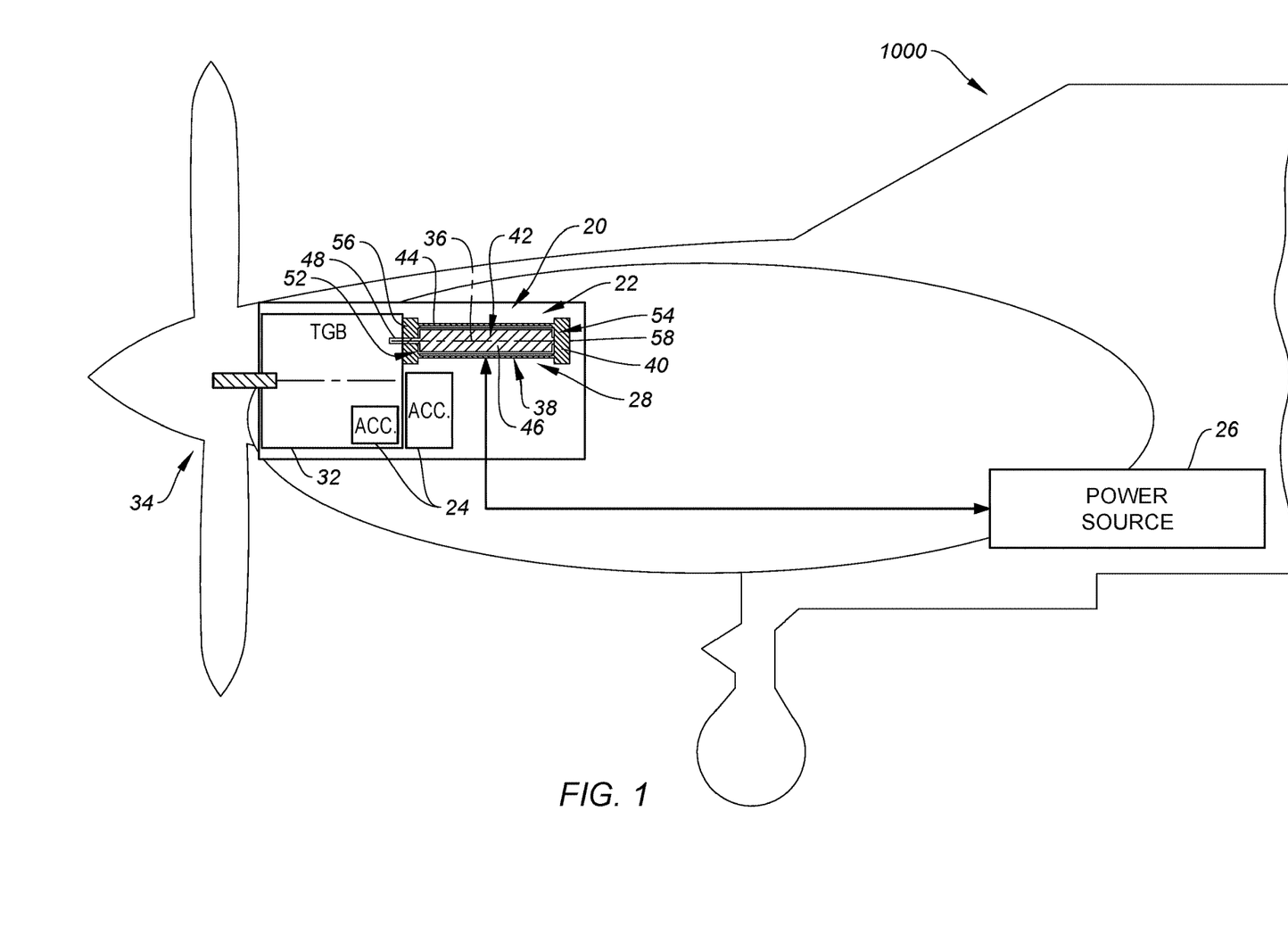
FIG. 1 schematically illustrates a side, cutaway view of a portion of an aircraft including an electric propulsion system, in accordance with one or more embodiments of the present disclosure.

FIG. 1 schematically illustrates a propulsion system 20 configured for an aircraft, such as the aircraft 1000 of FIG. 1. The aircraft 1000 may be a fixed-wing aircraft (e.g., an airplane), as shown in FIG. 1. Moreover, the aircraft may be a manned aerial vehicle or an unmanned aerial vehicle (UAV, e.g., a drone).

The propulsion system 20 of FIG. 1 includes a rotational assembly 22, one or more accessory load assemblies 24, and an electrical power source 26. The rotational assembly 22 includes an electric motor assembly 28, a transmission gearbox (TGB) module 32, and a propulsor 34 (e.g., a propeller).

The electric motor assembly 28 includes an electric motor 38 and a motor housing 40. The electric motor 38 is electrically connected to the electrical power source 26. For example, the electric motor 38 is configured to receive electrical power from the electrical power source 26 for operation of the electric motor 38. The electric motor 38 may additionally be configured to direct electrical power to the electrical power source 26 (e.g., the electric motor 38 may be configured to operate as an electrical generator). The electric motor 38 may be configured as an alternating current (AC) electric motor or a direct current (DC) electric motor. For example, the electric motor 38 may be configured as a synchronous electric motor, an induction motor (e.g., an asynchronous electric motor), a permanent magnet electric motor, or the like, and the present disclosure is not limited to any particular electric motor configuration. The electric motor assembly 28 may further include other electrical control and/or conditioning equipment and components such as, but not limited to, an inverter, a motor controller, AC/DC conversion equipment, and/or the like.

The electric motor 38 of FIG. 1 includes a rotor 42 and a stator 44. The rotor 42 is configured for rotation about a rotational axis 36. The rotor 42 includes a rotor body 46. The rotor 42 may additionally include a shaft 48. The rotor body 46 is disposed in the motor housing 40. The rotor body 46 extends (e.g., axially extends) between and to a first axial end 52 of the rotor body 46 and a second axial end 54 of the rotor body 46. The shaft 48 is disposed at (e.g., on, adjacent, or proximate) the first axial end 52. The shaft 48 extends along the rotational axis 36 axially outward from the first axial end 52. For example, the shaft 48 may extend through the motor housing 40 to the TGB module 32. The stator 44 of FIG. 1 extends circumferentially about (e.g., completely around) the rotational axis 36 and the rotor body 46 in the motor housing 40.

The motor housing 40 is configured to support and house the electric motor 38. The motor housing 40 may extend circumferentially about (e.g., completely around) the rotational axis 36. The motor housing 40 extends (e.g., axially extends) between and to a first axial end 56 of the motor housing 40 and a second axial end 58 of the motor housing 40. The motor housing 40 may be attached to the TGB module 32, for example, at (e.g., on, adjacent, or proximate) the first axial end 56. The motor housing 40 may form or otherwise include a flange or other suitable mounting configuration for mounting the motor housing 40 to the TGB module 32. The motor housing 40 may additionally include one or more bearing assemblies for rotatably supporting the rotor 42 and its shaft 48.

Figures 2, 3:
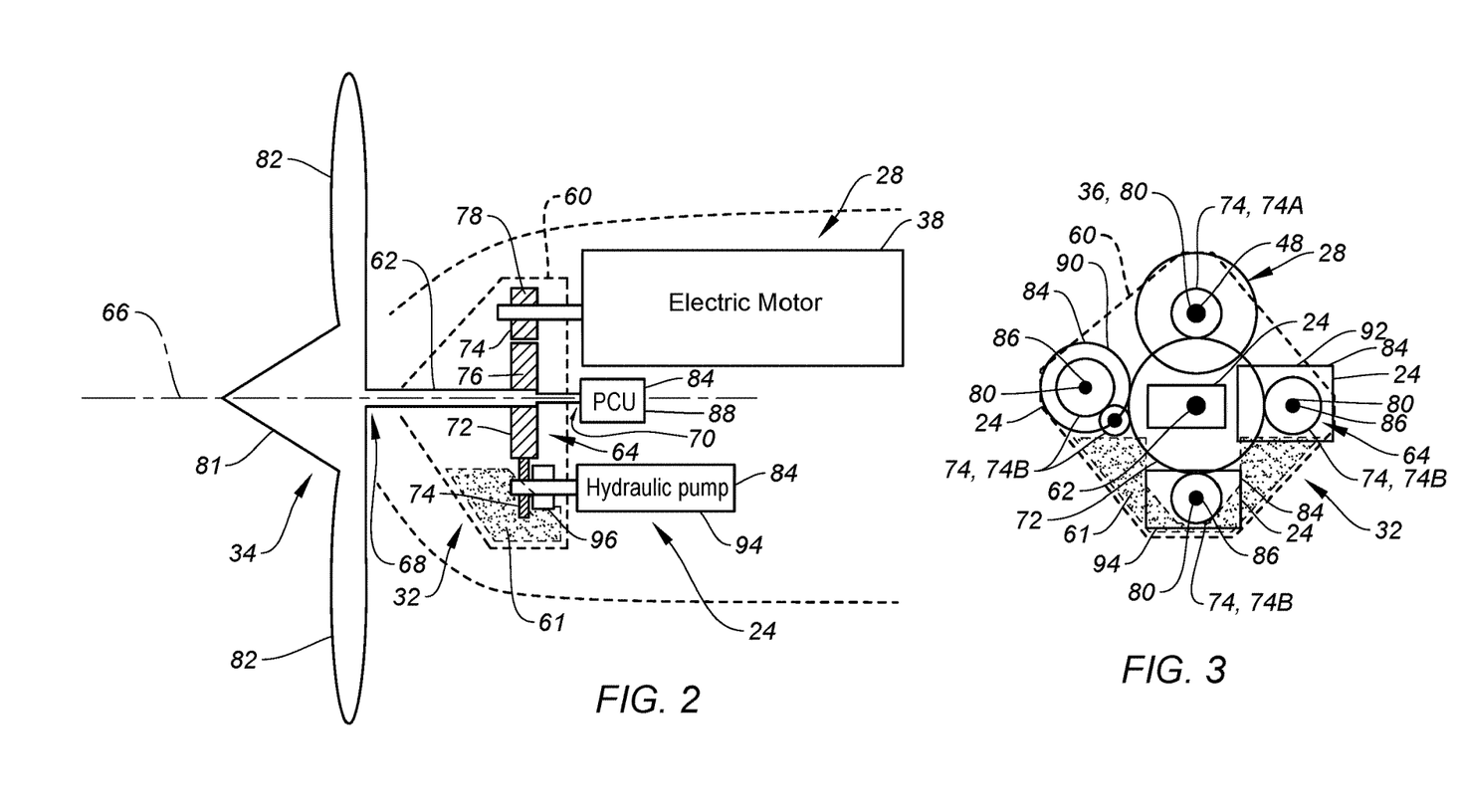
FIG. 2 schematically illustrates a side, cutaway view of a rotational assembly for an electric propulsion system, in accordance with one or more embodiments of the present disclosure.
FIG. 3 schematically illustrates a front, cutaway view of the rotational assembly of FIG. 2, in accordance with one or more embodiments of the present disclosure.

FIGS. 2 and 3 schematically illustrate cutaway views of portions of the TGB module 32 coupled to accessory load assemblies 24 and the electric motor assembly 28. The TGB module 32 includes a gearbox housing 60, an output shaft 62, and a gear assembly 64.

The gearbox housing 60 may be mounted to or otherwise disposed at (e.g., on, adjacent, or proximate) the electric motor assembly 28 (e.g., the motor housing 40 at the first axial end 56; see FIG. 1). The gearbox housing 60 may extend about (e.g., completely around) an axial centerline 66 of the gear assembly 64. The gearbox housing 60 may surround and provide support for the output shaft 62 and the gear assembly 64. The gearbox housing 60 may additionally provide support for the accessory load assemblies 24, as will be discussed in further detail. The gearbox housing 60 may additionally include or otherwise support one or more bearing assemblies for rotatably supporting the output shaft 62. The gearbox housing 60 may form an oil cavity 61 (e.g., an oil sump) within the gearbox housing 60. The oil cavity 61 may be formed by the gearbox housing 60 vertically below the output shaft 62, for example, at a vertical bottom of the gearbox housing 60 (e.g., with respect to a normal attitude of the propulsion system 20; see FIG. 1). Oil from the electric motor 38, the output shaft 62, the gear assembly 64, bearing assemblies, and/or other oil-lubricated and/or oil-cooled components of the rotational assembly 22 may drain to or otherwise be directed to the oil cavity 61.

The output shaft 62 extends circumferentially about (e.g., completely around) the axial centerline 66. The axial centerline 66 of FIGS. 2 and 3 is a rotational axis of the output shaft 62. The output shaft 62 extends between and to a first axial end 68 of the output shaft 62 and a second axial end 70 of the output shaft 62. The first axial end 68 is mounted to or otherwise disposed at (e.g., on, adjacent, or proximate) the propulsor 34 such that rotation of the output shaft 62 about the axial centerline 66 drives rotation of the propulsor 34.

The gear assembly 64 of FIGS. 2 and 3 includes a main gear 72 and a plurality of offset gears 74. The main gear 72 extends circumferentially about (e.g., completely around) the axial centerline 66. The axial centerline 66 of FIGS. 2 and 3 is a rotational axis of the main gear 72. The main gear 72 is fixedly mounted to the output shaft 62. For example, the main gear 72 may be mounted to the output shaft 62 at (e.g., on, adjacent, or proximate) the second axial end 70. Alternatively, the main gear 72 may be mounted to an axially intermediate portion of the output shaft 62 between the first axial end 68 and the second axial end 70. The main gear 72 circumscribes the output shaft 62. The main gear 72 is configured for rotation about the axial centerline 66 with the output shaft 62. The main gear 72 includes gear teeth 76 engaged with (e.g., meshed with) each of the offset gears 74. The offset gears 74 are radially offset from the axial centerline 66. Each of the offset gears 74 includes gear teeth 78 engaged with (e.g., meshed with) the main gear 72 (e.g., the gear teeth 76) or the gear teeth 78 of another of the offset gears 74. Each of the offset gears 74 is rotatable about a respective rotational axis 80. A first offset gear 74A is fixedly mounted to the shaft 48, thereby coupling the rotor 42 (see FIG. 1) to the gear assembly 64. One or more second offset gears 74B are coupled to respective accessory load assemblies 24 to drive the respective accessory load assemblies 24 in response to rotation of the main gear 72. Each of the offset gears 74 may be sized (e.g., relative to the main gear 72) to facilitate a suitable rotation speed (e.g., speed ratio) for the different rotational components (e.g., the propulsor 34, the electric motor 38, the accessory load assemblies 24, etc.) coupled to the gear assembly 64. The gear assembly 64 of FIGS. 2 and 3 includes five offset gears 74, however, the present disclosure is not limited to any particular number, arrangement, size, or other configuration of the offset gears 74.

The propulsor 34 is configured for rotation about a rotational axis. The rotational axis of the propulsor 34 may be the axial centerline 66 as shown in FIG. 2, or another rotational axis which is different than the axial centerline 66. The propulsor 34 of FIG. 2 is configured as a propeller. For example, the propulsor 34 of FIG. 2 includes a hub 81 and a plurality of propeller blades 82. The propeller blades 82 are mounted to the hub 81. The propeller blades 82 are circumferentially distributed about the hub 81, for example, relative to the axial centerline 66. The propeller blades 82 may be configured as variable-pitch propeller blades. For example, the propeller blades 82 may each be rotatable about a lengthwise axis to control (e.g., selectively vary) a pitch (e.g., an angle; sometimes referred to as a "beta angle") of the propeller blades 82. The present disclosure, however, is not limited to propeller configurations for the propulsor 34 and the propulsor 34 may alternatively be configured as a fan (e.g., for a turbofan propulsion system), an open rotor propulsor, or another configuration of aircraft propulsion rotor.

Each of the accessory load assemblies 24 may be disposed within or axially adjacent the gearbox housing 60. For example, the accessory load assemblies 24 may be disposed at (e.g., on, adjacent, or proximate) an aft end of the gearbox housing 60. Each of the accessory load assemblies 24 includes at least one accessory load 84. The at least one accessory load 84 may be mounted to or otherwise supported by the gearbox housing 60. For example, the at least one accessory load 84 may be mounted to an exterior or an interior of the gearbox housing 60. The accessory load assemblies 24 may be disposed axially coincident with the electric motor 38. Each of the accessory load assemblies 24 at least one accessory load 84. Each of the accessory load assemblies 24 may further include a shaft 86. The at least one accessory load 84 of each of the accessory load assemblies 24 is coupled to a respective one of the gears 72, 74 of the gear assembly 64, for example, by the shaft 86. The at least one accessory load 84 may be mounted to and driven by the main gear 72. For example, the at least one accessory load 84 may be mounted to the main gear 72 by the shaft 86. Alternatively, the at least one accessory load 84 may be mounted to the main gear 72 by the output shaft 62 (e.g., the at least one accessory load 84 may be mounted to the second axial end 70). The at least one accessory load 84 may be mounted to and driven by one of the offset gears 74. For example, the at least one accessory load 84 may be mounted to one of the offset gears 74 by the shaft 86.

The at least one accessory load 84 for each of the accessory load assemblies 24 facilitates one or more support functions of the aircraft 1000 or its propulsion system 20 (see FIG. 1). FIGS. 2-3 illustrate examples of the at least one accessory load 84 including, but not limited to, a propeller control unit (PCU) 88, an air compressor unit 90, an electrical generation unit 92 (e.g., a low-voltage generator), a hydraulic pump 94, and one or more oil pumps 96. The present disclosure, however, is not limited to the aforementioned exemplary accessory loads 84 and the at least one accessory load 84 may include additional or alternative rotational loads or other loads. For configurations of the propulsion system 20 in which the propulsor 34 includes variable-pitch propeller blades 82, the PCU 88 may control (e.g., modulate) the pitch of the propeller blades 82. For example, the PCU 88 may control the pitch of the propeller blades 82 to achieve a desired thrust of the propulsion system 20 (see FIG. 1) while the propulsor 34 rotation speed remains constant or substantially constant (e.g., a constant-speed propeller assembly). The air compressor unit 90 may supply high-pressure air for the aircraft 1000 and/or its propulsion system 20. For example, the high-pressure air may be supplied to an environmental control system (ECS) of the aircraft 1000, for pneumatic systems of the aircraft 1000 and/or the propulsion system 20, for air cooling systems, etc. The electrical generation unit 92 may be used to generate and supply electrical power (e.g., low-voltage electrical power), for example, to one or more electronic control systems of the aircraft 1000 and/or the propulsion system 20. The hydraulic pump 94 may be used, for example, to supply a pressurized hydraulic fluid to the aircraft 1000 and/or the propulsion system 20 to effect operation of one or more hydraulic-actuated systems such as aircraft control surfaces, aircraft landing gear assemblies, thrust reverser assemblies, and the like. The oil pumps 96 may be configured to supply oil to components of the rotational assembly 22 such as, but not limited to, the electric motor 38, bearing assemblies, the gear assembly 64, and/or the PCU 88. The oil pumps 96 may additionally or alternatively be configured as a scavenge pump to return oil from the aforementioned components of the rotational assembly 22 to an oil tank or other oil storage component. The oil pumps 96 are positioned within the gearbox housing 60, for example, within or at (e.g., on, adjacent, or proximate) the oil cavity 61.

Referring again to FIG. 1, the electric power source 26 is electrically connected to the electric motor 38 to supply electric power to the electric motor 38 for driving the TGB module 32 (e.g., the gear assembly 64). The electric power source 26 may include an electric generating source such as, but not limited to, an auxiliary power unit (APU) or a fuel cell generator (e.g., a hydrogen fuel cell generator). The electric power source 26 may additionally or alternatively include an electric power storage device such as, but not limited to, one or more batteries and/or one or more capacitors. The present disclosure is not limited to any particular configuration of the electric power source 26 provided the electric power source 26 can supply electric power to the electric motor 38 for operation of the electric motor. The electric power source 26 may be disposed in the propulsion system 20 or the aircraft 1000 on which the propulsion system 20 is mounted.

In operation, the electric motor 38 drives rotation of the rotor 42 about the rotational axis 36. The rotor 42, coupled with the gear assembly 64 (e.g., the first offset gear 74A) by the shaft 48, drives the gear assembly 64 and, thereby, the propulsor 34 and the accessory load assemblies 24.

The present disclosure electric motor assembly 28 and TGB module 32 may facilitate conversion of a gas turbine engine propulsion system to an electric propulsion system (e.g., a propulsion system using only electrical power for propulsion). The configuration of the radially offset electric motor assembly 28 (e.g., from the axial centerline 66) and the accessory load assemblies 24 axially coincident with the electric motor assembly 28 may accommodate limited axial space of the propulsion system 20 which may be available for components of the electric motor assembly 28 and TGB module 32, as will be discussed in further detail. The configuration of the TGB module 32 and the accessory load assemblies 24 may additionally facilitate improved reliability of components of the propulsion system 20. For example, in the event of a failure of the electrical power source 26, the electric motor assembly 28, or another component which prevents or otherwise inhibits operation of the electric motor 38, the propulsor 34 may be operated in a feathering mode, such that rotation of the propulsor 34 (e.g., driven by ambient air flow) drives the output shaft 62 and the accessory load assemblies 24. Accordingly, accessory loads 84 such as the PCU 88, the air compressor unit 90, the electrical generation unit 92, the hydraulic pump 94, and the oil pumps 96 may still be available for operation to supply propulsion system 20 and/or aircraft 1000 loads.

Figure 4:
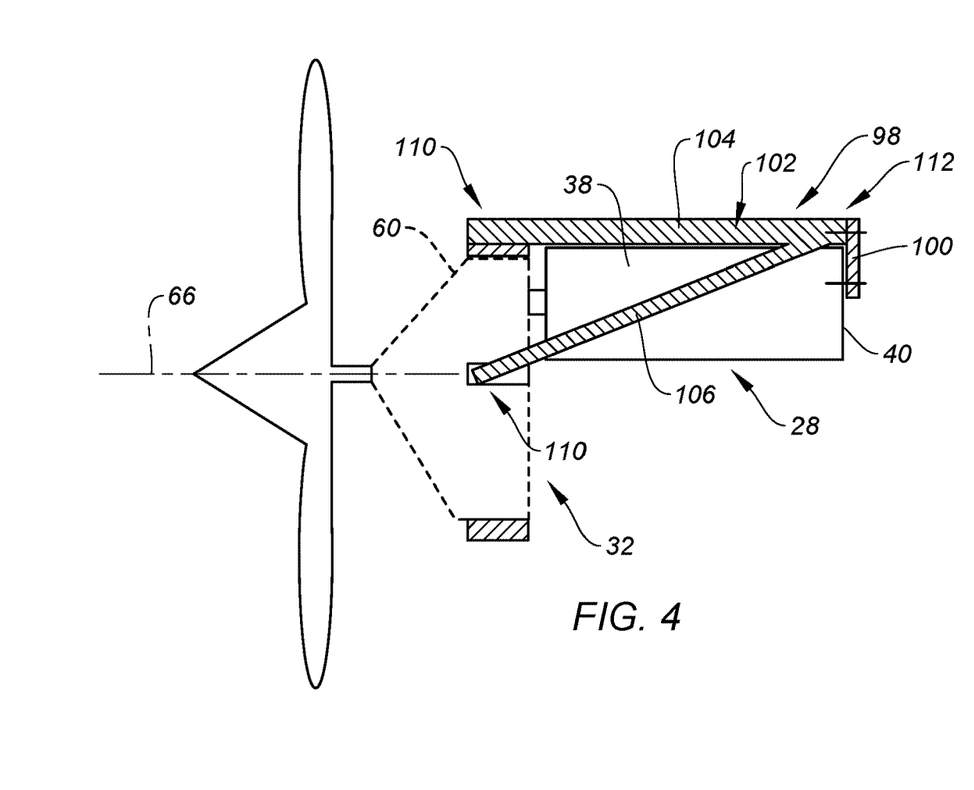
FIG. 4 schematically illustrates a side, cutaway view of another rotational assembly for an electric propulsion system including a mount assembly, in accordance with one or more embodiments of the present disclosure.
Figure 5:
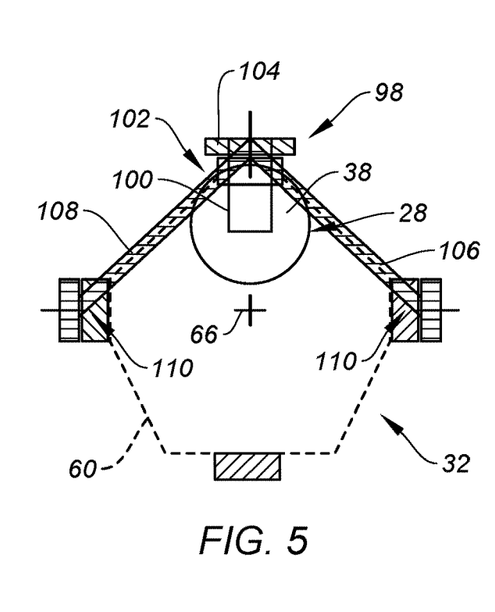
FIG. 5 schematically illustrates a front, cutaway view of the rotational assembly of FIG. 4, in accordance with one or more embodiments of the present disclosure.

Referring to FIGS. 4 and 5, in some embodiments, the electric motor assembly 28 may include a mount assembly 98 configured to support the electric motor 38 in its radially offset position relative to the TGB module 32 and the axial centerline 66. FIG. 4 illustrates a side, cutaway view of the electric motor assembly 28 and the TGB module 32. FIG. 5 illustrates a front, cutaway view of the electric motor assembly 28 and the TGB module 32. The mount assembly 98 of FIGS. 4 and 5 includes a motor bracket 100 and a plurality of struts 102. The motor bracket 100 is fixedly mounted to the motor housing 40, for example, at an aft end of the motor housing 40. The plurality of struts 102 of FIGS. 4 and 5 includes an upper strut 104, a first lateral strut 106, and a second lateral strut 108. Each of the upper strut 104, the first lateral strut 106, and the second lateral strut 108 extend between and to a first axial end 110 of the struts 104, 106, 108 and a second axial end 112 of the struts 104, 106, 108. The struts 104, 106, 108 are fixedly mounted to the gearbox housing 60 at their respective first axial ends 110. For example, the first axial end 110 of the upper strut 104 may be mounted to a vertically upper portion (e.g., a mounting pad) of the gearbox housing 60 (e.g., with respect to a normal attitude of the propulsion system 20; see FIG. 1). The first axial end 110 of the first lateral strut 106 may be mounted to a first lateral portion (e.g., an outer radial portion) of the gearbox housing 60. The first axial end 110 of the second lateral strut 108 may be mounted to a second lateral portion (e.g., an outer radial portion) of the gearbox housing 60 opposite the first lateral portion. The second axial end 112 of each of the struts 104, 106, 108 may be mounted to or otherwise disposed at (e.g., on, adjacent, or proximate) the motor bracket 100. The configuration of the mount assembly 98 may facilitate a reduction in bending moment of the electric motor assembly 28 (e.g., the motor housing 40, the rotor 42, and/or the shaft 48) at the interface between the electric motor assembly 28 and the gearbox housing 60.

Figure 6:
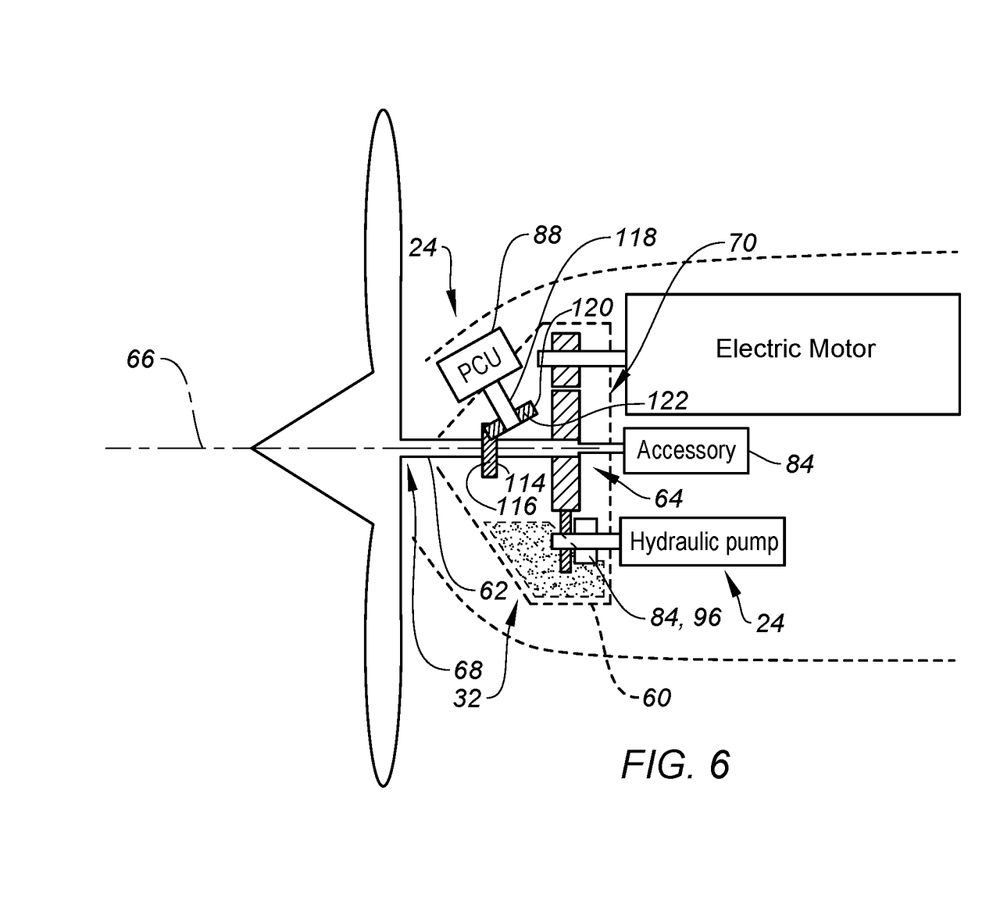
FIG. 6 schematically illustrates a side, cutaway view of another rotational assembly for an electric propulsion system, in accordance with one or more embodiments of the present disclosure.

Referring to FIG. 6, in some embodiments, the PCU 88 may be coupled to an axially intermediate portion of the output shaft 62, for example, forward of the gear assembly 64. FIG. 6 illustrates a side, cutaway view of the accessory load assemblies 24 and the TGB module 32. The output shaft 62 of FIG. 6 forms or otherwise includes a bevel gear 114 on a radial exterior of the output shaft 62. The bevel gear 114 extends circumferentially about (e.g., completely around) the axial centerline 66. The bevel gear 114 may be disposed between (e.g., axially between) and spaced from the first axial end 68 and the second axial end 70, for example, within the gearbox housing 60. The bevel gear includes gear teeth 116. The PCU 88 of FIG. 6 is disposed outside the gearbox housing 60. The PCU 88 of FIG. 6 is mounted to or otherwise disposed at (e.g., on, adjacent, or proximate) the gearbox housing 60, for example, on a forward end of the gearbox housing 60. The PCU 88 is coupled to the bevel gear 114 by a tower shaft 118 and a pinion gear 120. The tower shaft 118 interconnects the PCU 88 and the pinion gear 120. The pinion gear 120 includes gear teeth 122. The gear teeth 122 are engaged with (e.g., meshed with) the bevel gear 114 (e.g., the gear teeth 116). The PCU 88 of FIG. 6 may be supplied with pressurized oil from a sleeve extending radially through the output shaft 62.

Figure 7:
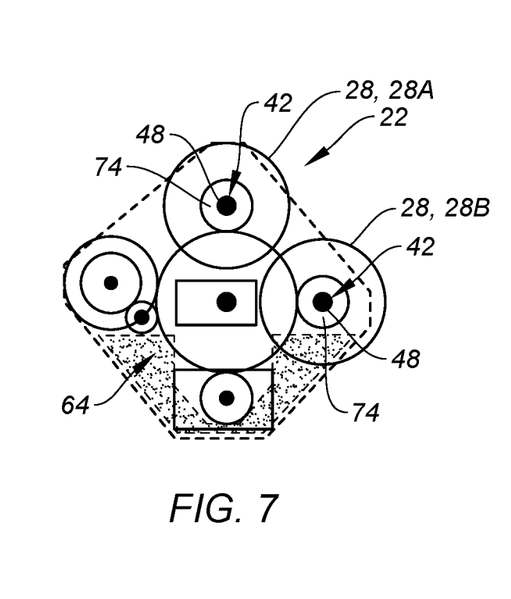
FIG. 7 schematically illustrates a front, cutaway view of another rotational assembly for an electric propulsion system, in accordance with one or more embodiments of the present disclosure.

Referring to FIG. 7, in some embodiments, the rotational equipment assembly 22 may include more than one electric motor assembly 28. For example, the rotational equipment assembly 22 of FIG. 7 includes two electric motor assemblies 28 (e.g., a first electric motor assembly 28A and a second electric motor assembly 28B). The rotor 42 of each of the first electric motor 28A and the second electric motor 28B is mounted to a respective one of the offset gears 74

(e.g., by the shaft 48). The rotational equipment assembly 22 of FIG. 7, having more than one electric motor assembly 28 coupled to the gear assembly 64, may facilitate improved reliability and/or thrust output of the propulsion system 20 (see FIG. 1).

Figure 8:
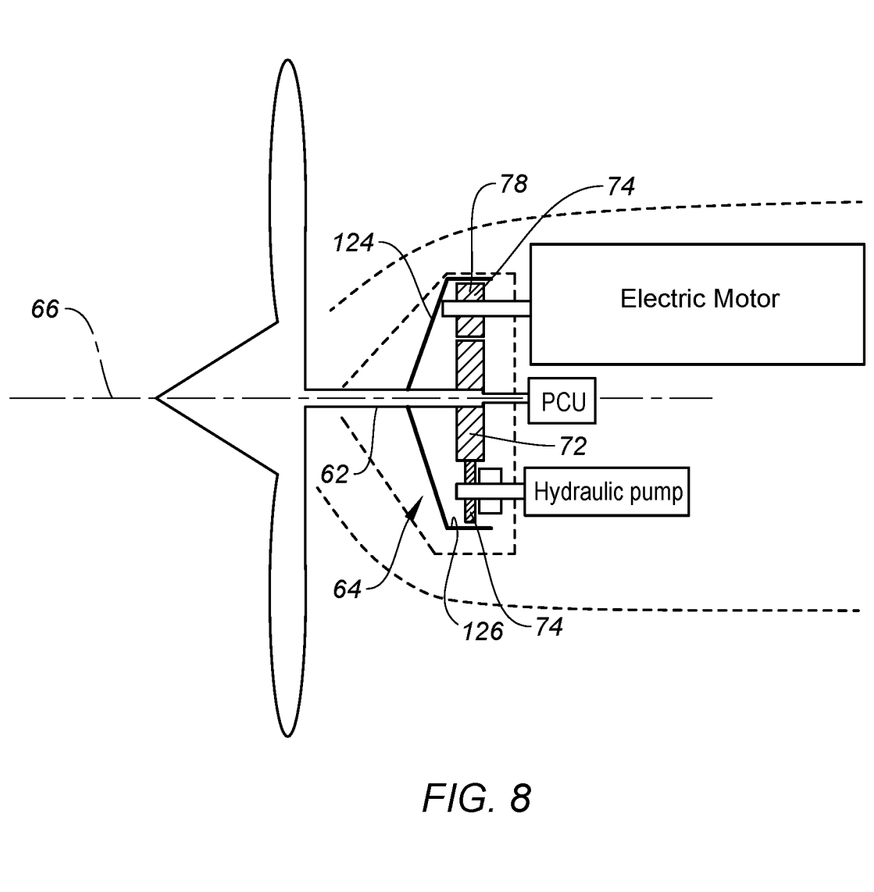
FIG. 8 schematically illustrates a side, cutaway view of another rotational assembly for an electric propulsion system, in accordance with one or more embodiments of the present disclosure.

Referring to FIG. 8, in some embodiments, the gear assembly 64 may further include a ring gear 124. The ring gear 124 extends circumferentially about (e.g., completely around) the axial centerline 66. The ring gear 124 circumscribes the offset gears 74. The ring gear 124 includes gear teeth 126 engaged with (e.g., meshed with) the gear teeth 78 for the offset gears 74. The ring gear 124 is fixedly mounted to the output shaft 62. Rotation of the offset gears 74 drives rotation of the ring gear 124 about the axial centerline 66, thereby driving rotation of the output shaft 62. In the embodiment of FIG. 8, the output shaft 62 may extend through the main gear 72 but may not be rotationally fixed relative to the main gear 72.

Figure 9:
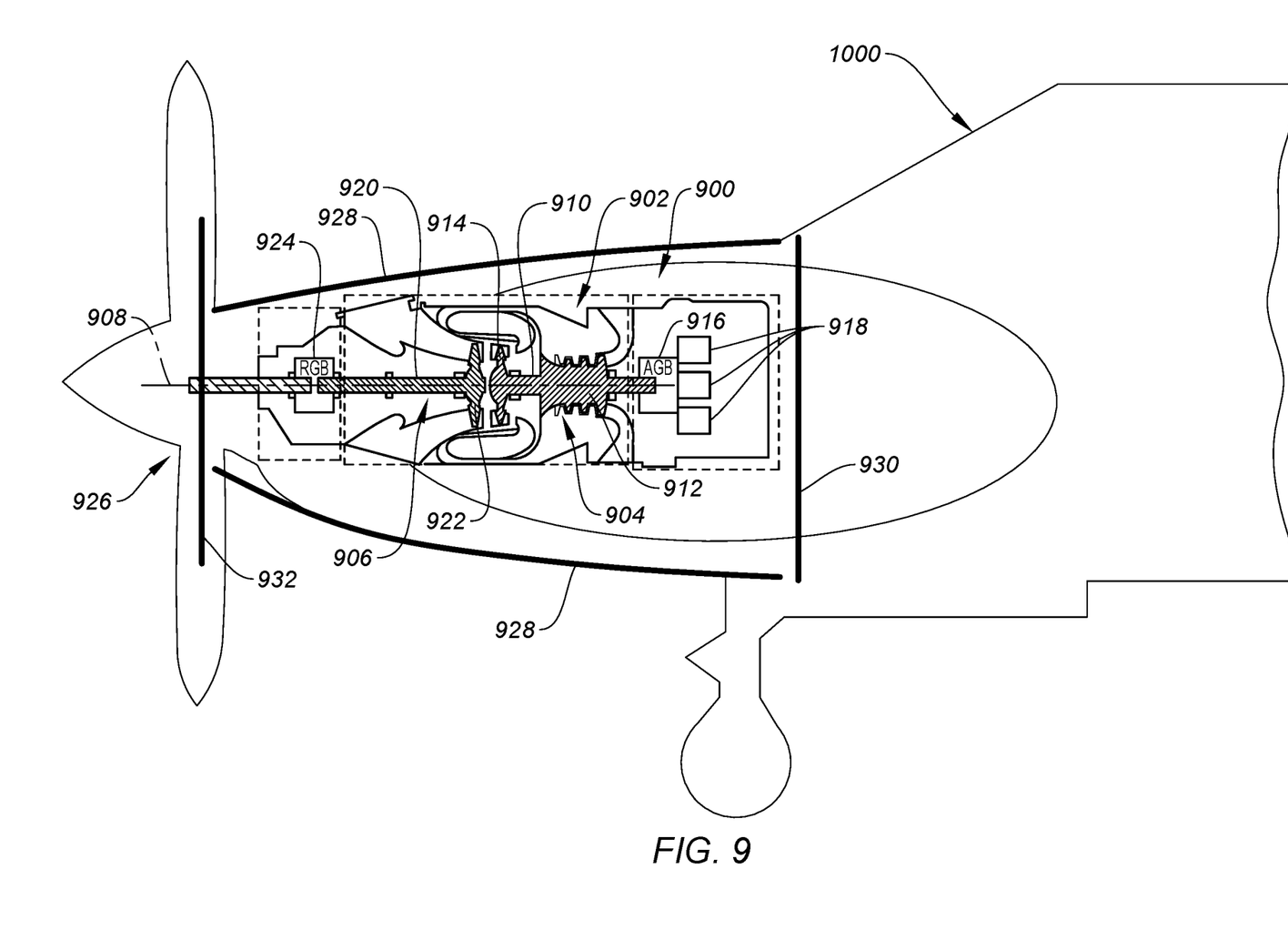
FIG. 9 schematically illustrates a side, cutaway view of a portion of an aircraft including a gas turbine engine propulsion system, in accordance with one or more embodiments of the present disclosure.

FIG. 9 illustrates an exemplary propulsion system 900 for an aircraft, such as the aircraft 1000, which exemplary propulsion system 900 may be modified in accordance with aspects of the present disclosure. The propulsion system 900 of FIG. 9 includes a gas turbine engine 902. The gas turbine engine 902 of FIG. 9 includes a first rotational assembly 904 and a second rotational assembly 906 arranged sequentially along an axial centerline 908 of the gas turbine engine 902. The first rotational assembly 904 (e.g., a high-pressure spool) includes a first shaft 910, a bladed compressor rotor 912, and a bladed first turbine rotor 914. The first shaft 910 interconnects the bladed compressor rotor 912 and the bladed first turbine rotor 914. The first shaft 910 is coupled to an accessory gearbox (AGB) assembly 916. Rotation of the bladed first turbine rotor 914 about the axial centerline 908 drives the AGB assembly 916 which, in turn, drives at least one accessory load 918 such as, but not limited to, accessory loads of the propulsion system 900. The second rotational assembly 906 (e.g., a low-pressure spool or a power spool) includes a second shaft 920 and a bladed second turbine rotor 922. The second shaft 920 is connected to the bladed second turbine rotor 922. The second shaft 920 is coupled to a reduction gearbox (RGB) assembly 924. Rotation of the bladed second turbine rotor 922 about the axial centerline 908 drives the RGB assembly 924 which, in turn, drives rotation of a propulsor 926 to generate thrust for the propulsion system 900.

Still referring to FIG. 9, the propulsion system 900 may have a number of shape and/or size constraints which may further complicate conversion to an electric propulsion system configuration (e.g., the propulsion system 20). For example, a housing 928 (e.g., nacelle) of the propulsion system 900 may have an aerodynamic shape to facilitate optimal propulsor 926 thrust efficiency, pilot visibility, and aerodynamic drag. Accordingly, modification of a size and/or shape of the housing 928 to accommodate an electric propulsion system configuration may be undesirable. Moreover, modification or replacement of the housing 928 to accommodate an electric propulsion system configuration may be expensive and time consuming. The aircraft 1000 may include a cabin firewall 930 between the propulsion system 900 and occupied areas of the aircraft 1000, which cabin firewall 930 may limit an axial extent of an electric propulsion system configuration. The location of the propulsor 926 (e.g., a propeller plane axial position 932) may further limit the axial extent of an electric propulsion system configuration. In accordance with the present disclosure, the electric motor assembly 28 and the TGB module 32 may be used to replace the gas turbine engine 902 for propulsion and accessory loads of the propulsion system 20, 900 while fitting within the narrow allowable space which may be available for at least some propulsion system configurations.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. An assembly for a propulsion system of an aircraft, the assembly comprising:
 a gearbox module including a gear assembly and an output shaft, the output shaft includes a first axial end and a second axial end, the gear assembly includes a main gear and a plurality of offset gears, the plurality of offset gears are directly engaged with the main gear, the output shaft and the main gear are configured for rotation about an axial centerline of the gear assembly;
 an electric motor assembly including an electric motor, the electric motor includes a rotor, the rotor is mounted to a first offset gear of the plurality of offset gears, the rotor is configured for rotation about a rotational axis to drive rotation of the gear assembly and the output shaft;
 a first accessory load assembly including at least one first accessory load, the at least one first accessory load is mounted to a second offset gear of the plurality of offset gears;
 a propulsor coupled to the first axial end of the output shaft; and
 a second accessory load assembly including at least one second accessory load, the at least one second accessory load is mounted to the second axial end of the output shaft.

2. The assembly of claim 1, wherein the rotational axis is radially offset from the axial centerline.

3. The assembly of claim 1, wherein the output shaft is fixedly mounted to the main gear.

4. The assembly of claim 1, wherein the first accessory load assembly is axially coincident with the electric motor assembly.

5. The assembly of claim 1, wherein the second accessory load assembly is axially coincident with the electric motor assembly.

6. The assembly of claim 1, wherein the output shaft includes a bevel gear, the assembly further comprising a third accessory load assembly including at least one third accessory load, the at least one third accessory load is engaged with the bevel gear.

7. The assembly of claim 1, wherein the gear assembly further includes a ring gear engaged with each of the offset gears, the ring gear is mounted to the output shaft and configured to drive the output shaft for rotation about the axial centerline.

8. The assembly of claim 1, wherein:
 the gearbox module includes a gearbox housing surrounding the gear assembly and the output shaft;
 the electric motor assembly includes a motor housing; and
 the motor housing is mounted to the gearbox housing.

9. The assembly of claim 8, wherein the electric motor assembly further includes a mount assembly mounting the motor housing to the gearbox housing, the mount assembly includes a motor bracket and a plurality of struts, the motor bracket is mounted to the motor housing at an aft end of the motor housing, each of the plurality of struts extends between and connects the motor bracket to the gearbox housing.

10. The assembly of claim 1, wherein the first accessory load assembly includes an oil pump disposed at a vertical bottom of the gearbox module.

11. The assembly of claim 10, wherein the gearbox module includes a gearbox housing surrounding the gear assembly and the output shaft, and the oil pump is disposed within the gearbox housing.

12. An assembly for a propulsion system of an aircraft, the assembly comprising:
 a propulsor;
 a gearbox module including a gear assembly and an output shaft, the gear assembly includes a main gear and a plurality of offset gears, the main gear is configured for rotation about an axial centerline of the gear assembly, the plurality of offset gears are directly engaged with the main gear, the plurality of offset gears includes a first offset gear and a plurality of second offset gears, the output shaft extends along the axial centerline in a first direction and interconnects the propulsor and the main gear;
 an electric motor assembly including an electric motor, the electric motor includes a rotor, the rotor is mounted to the first offset gear, the rotor is configured for rotation about a rotational axis to drive rotation of the first offset gear;
 a plurality of accessory load assemblies, each accessory load assembly of the plurality of accessory load assemblies including at least one accessory load coupled to a respective second offset gear of the plurality of second offset gears; and
 a second accessory load assembly including at least one second accessory load, the output shaft extends along the axial centerline in a second direction, opposing the first direction, and interconnects the at least one second accessory load and the main gear.

13. The assembly of claim 12, wherein the plurality of accessory load assemblies are axially coincident with the electric motor assembly.

14. The assembly of claim 12, wherein each offset gear of the plurality of offset gears is disposed radially adjacent the main gear with respect to the axial centerline.

15. The assembly of claim 12, wherein the rotational axis is radially offset from the axial centerline.

16. An assembly for a propulsion system of an aircraft, the assembly comprising:
 a propulsor;
 a gearbox module including a gear assembly and an output shaft, the gear assembly includes a main gear and a plurality of offset gears, the plurality of offset gears are directly engaged with the main gear, the plurality of offset gears includes a first offset gear and a plurality of second offset gears, the output shaft interconnects the propulsor and the main gear;
 an electric motor assembly including an electric motor, the electric motor includes a rotor, the rotor is mounted to the first offset gear, the rotor is configured for rotation about a rotational axis to drive rotation of the first offset gear; and
 a plurality of accessory load assemblies, each accessory load assembly of the plurality of accessory load assemblies including at least one accessory load coupled to a respective gear of the main gear or the plurality of offset gears, a first accessory load assembly of the plurality of load assemblies including a first accessory load, the first accessory load mounted to the output shaft.

17. The assembly of claim 16, wherein the gearbox module includes a gearbox housing surrounding the gear assembly and the output shaft.

18. The assembly of claim 17, wherein the plurality of accessory load assemblies includes a second accessory load assembly including a second accessory load and a third accessory load, the second accessory load disposed within the gearbox housing and the third accessory load disposed outside the gearbox housing.

19. The assembly of claim 18, wherein the second accessory load is an oil pump disposed at a vertical bottom of the gearbox housing.

* * * * *